United States Patent [19]

Fortsch

[11] Patent Number: 5,042,181
[45] Date of Patent: Aug. 27, 1991

[54] CABLE TIE IDENTIFICATION TAG

[75] Inventor: William A. Fortsch, Bernardsville, N.J.

[73] Assignee: Thomas & Betts Corporation, Bridgewater, N.J.

[21] Appl. No.: 466,173

[22] Filed: Jan. 17, 1990

[51] Int. Cl.⁵ .............................................. G09F 3/00
[52] U.S. Cl. ..................................... 40/316; 40/632; 40/664
[58] Field of Search ................. 40/316, 662, 664, 665, 40/301, 304, 299, 632; 24/16 PB, 30.5 P, 681

[56] References Cited

U.S. PATENT DOCUMENTS

| | | | |
|---|---|---|---|
| 1,759,560 | 5/1930 | Jones | 24/681 |
| 2,423,818 | 7/1947 | Schmutzler | 40/662 |
| 3,009,220 | 11/1961 | Fein . | |
| 3,186,047 | 6/1965 | Schwester et al. . | |
| 3,214,808 | 11/1965 | Litwin . | |
| 3,422,499 | 1/1969 | Merser | 24/16 PB |
| 3,486,257 | 12/1969 | Walldorf . | |
| 3,491,470 | 1/1970 | Geisinger . | |
| 4,425,394 | 1/1984 | Jenkins | 40/279 |
| 4,694,781 | 9/1987 | Howe et al. | 40/301 |
| 4,805,856 | 2/1989 | Nicoli et al. . | |

OTHER PUBLICATIONS

TY-RAP Cable Tie and Fastening Systems—1989 Thomas & Betts Catalog.

Primary Examiner—James R. Brittain
Assistant Examiner—James M. Gardner
Attorney, Agent, or Firm—Robert M. Rodrick; Salvatore J. Abbruzzese

[57] ABSTRACT

An identification tag used in combination with a cable tie is disclosed. The cable tie having a locking head with a channel therethrough and a strap having a tail for passage through the head channel, supports the identification tag. The tag includes a marking surface for supporting identifying indicia and means for securing the tag to the cable tie. An opening in the tag is disposed in alignment with the locking head channel to permit passage of the cable tie tail through the opening as well as through the locking head channel to further secure the tag to the cable tie.

5 Claims, 2 Drawing Sheets

CABLE TIE IDENTIFICATION TAG

FIELD OF THE INVENTION

The present invention relates generally to cable ties used to secure a bundle of wires and more particularly relates to a tag used with such a cable tie to identify a particular bundle of wires secured by the cable tie.

BACKGROUND OF THE INVENTION

Cable ties are widely used in the electrical industry for bundling one or more electrical wires. An example of one such cable tie is that shown in U.S. Pat. No. 3,186,047. Cable ties of this type typically include an elongate strap having a tail at one end and a head attached to the other end of the strap. The head includes a channel therethrough for receipt of the tail of the strap and locking means in the head for securing the tail therein after it has been coiled around a bundle of wires. Various improvements have been made in the cable tie field in an effort to provide further features and benefits to the end user.

One such improvement has been the use of indicia bearing surfaces in conjunction with the cable tie so that each bundle of wires can be marked to distinguish one bundle from another. The art has seen two techniques for providing such indicia bearing surfaces in conjunction with cable ties. The first includes identification plates which include openings therein which permit the strap of the cable tie to be threaded therethrough. The plates which may be marked with identifying indicia are secured around the bundle when the cable tie itself is secured. Identification plates such as these are shown in U.S. Pat. Nos. 3,486,257 and 3,491,470. One drawback of plates such as these is that the tail of the strap must be threaded through the opening in the plate and then again threaded through the head of the cable tie to lock the plate and the cable tie around the bundle.

Another identification technique used in conjunction with cable ties is to form the identification plate integrally with the strap of the cable tie. While this eliminates the necessity to thread a separate identification plate onto the cable tie strap, it does require users to inventory additional cable ties where the identification feature is needed.

Accordingly, it is desirable to provide an identification tag for use in conjunction with a standard existing cable tie which is easy to use and may be securely retained to the cable tie.

SUMMARY OF THE INVENTION

It is therefore an object of the present invention to provide an identification tag for use with a cable tie.

It is a further object of the present invention to provide an identification tag which may be securely supported on a conventional cable tie for attachment therewith around a bundle of wires.

In the efficient attainment of these and other objects, the present invention provides an identification tag for use with a cable tie having a locking head, a channel therethrough and a strap extending from the head, the strap having a tail at one end for passage through the channel of the head. The tag includes a surface capable of supporting identifying indicia and an opening therethrough. The tag further includes a means for securing the tag against the head and aligning the tag opening with the channel of the head for passage of the tail through the tag opening.

DETAILED DESCRIPTION OF THE PREFERRED EMBODIMENT

Figures 1, 2:
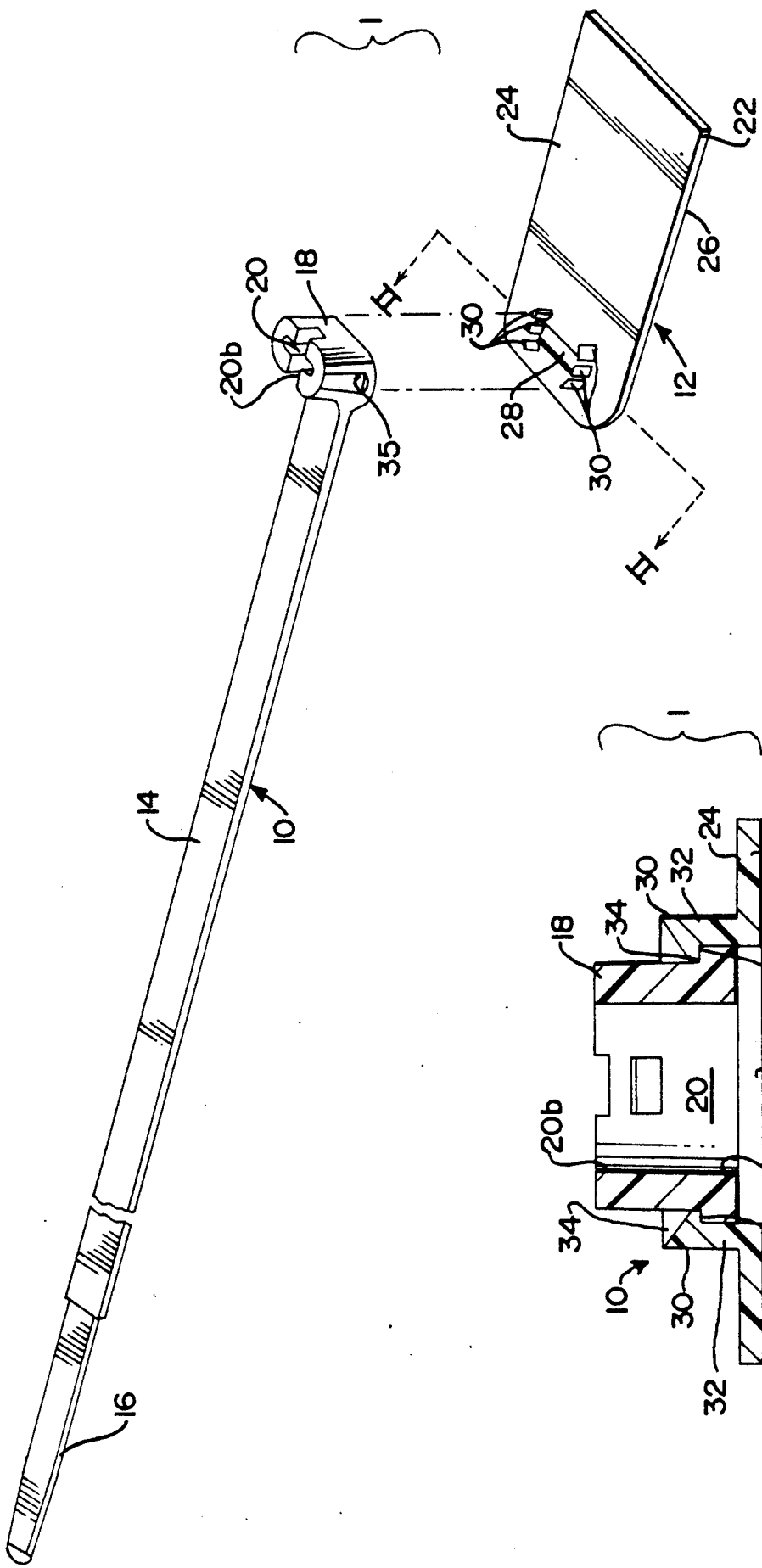
FIG. 1 shows the cable tie assembly of the present invention including a cable tie and identification tag.
FIG. 2 is a cross-section of the attached cable tie assembly of FIG. 1 taken through the lines II—II thereof.
Figure 3:
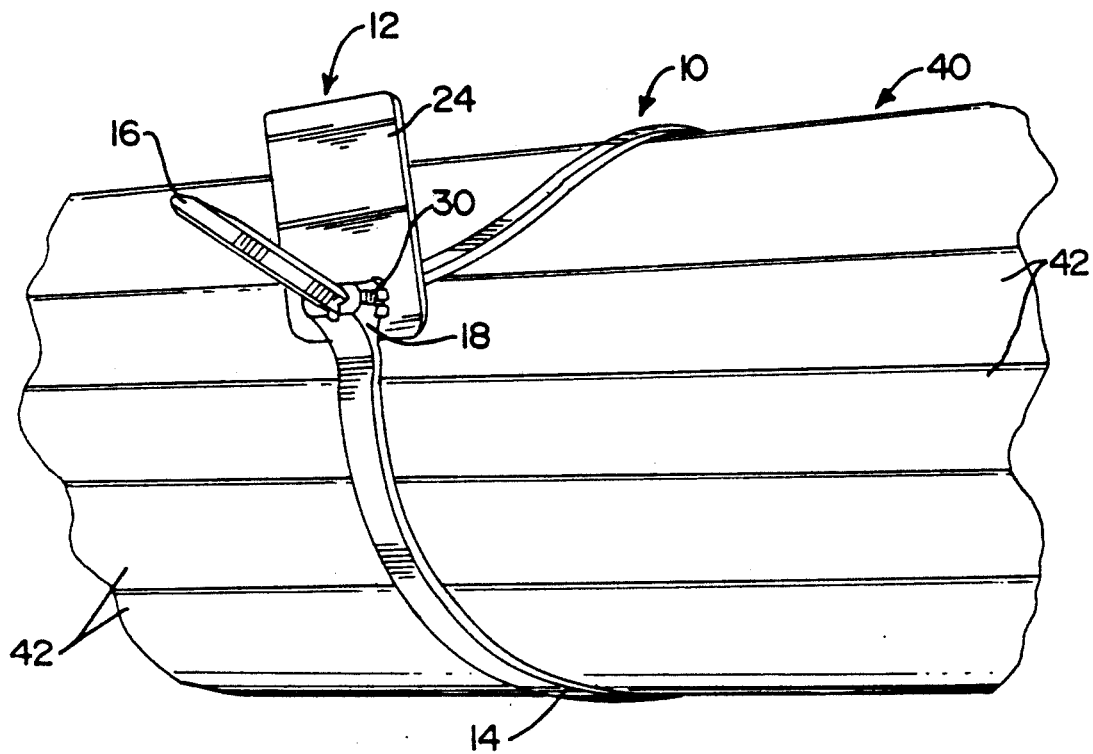
FIG. 3 shows the cable tie assembly of the present invention secured around a bundle of wires.

Referring to FIGS. 1 and 2, the cable tie assembly 1 of the present invention is shown. Cable tie assembly 1 includes a cable tie 10 and an identification tag 12. Cable tie 10 is similar to conventional cable ties widely known in the electrical industry and is similar to the type shown and described in U.S. Pat. No. 3,186,047. Cable tie 10 is an integral member typically formed of plastic having an elongate strap 14, one end of which includes a tail 16. The other end of strap 14 supports a cable tie head 18. Head 18 includes a channel 20 therethrough. Channel 20 being elongate and having a tail receiving end 20a and a tail egressing end 20b, accommodates tail 16 as shown in FIG. 3, when cable tie 10 is wrapped around a bundle of wires. Head 20 further includes a locking element (not shown) which engages tail 16 when tail 16 is passed through channel 20 to secure tail 16 in channel 20.

Identification tag 12 is generally a planar member which is preferably formed of plastic. Tag 12 includes a planar body portion 22 having opposed major surfaces 24 and 26. Planar body portion 22 includes an opening 28 extending between and through opposed surfaces 24 and 26 adjacent one end thereof. Opening 28, as shown in FIG. 1, is generally rectangular, however, any suitably shaped opening may be employed.

Planar body portion 22 further includes a plurality of securement fingers 30 which extend outwardly from opposed surface 24. In the presently described embodiment, six fingers 30 are shown disposed about opening 28. Three fingers 30 are disposed about each transverse end of opening 28. Fingers 30 are generally positioned to accommodate head 18 of cable tie 10 therein.

Shown in more detail in FIG. 2, each of fingers 30 includes an upstanding wall 32 extending perpendicularly from opposed surface 24 and an inwardly projecting tab portion 34. Fingers 30 are designed to engage and secure cable tie head 18 adjacent opening 28 of tag 12.

In presently described embodiment, cable tie head 18 includes opposed shoulder portions 35 integrally formed therewith which provide an engagement surface to accommodate tab portions 34 of fingers 30. Fingers 30, being formed of relatively resilient plastic, are deflectable permitting insertion of cable tie head 18 therebetween upon insertion of cable tie head 18 therein. Fingers 30 deflect permitting such insertion whereupon tab portions 34 engage shoulder 35 to retain cable tie head 18 on tag 12. The snap engagement of the fingers 30 with cable tie head 18 provides for removable securement of tag 18 to cable tie 10. While the particular embodiment shown herein employs snap finger engagement, other securement means may be employed to secure tag 12 to cable tie head 18. Such securement means may include structure which would support a standard cable tie currently being marketed and sold by various manufacturers.

Referring more specifically to FIG. 2, cable tie head 18 is supported on opposed surface 24 of tag 12 so that channel 20 is in alignment with opening 28. Tag 12 is supported adjacent the insertion end 20a of channel 20 so that when tail 16 is inserted thereinto it is also inserted through opening 28 of tag 12. Thus, the securement of tail 16 in cable tie head 18 also secures tag 12 to cable tie 10.

Referring now to FIG. 3, the securement of cable tie assembly 1 to a bundle of wires 40 is shown. Bundle 40 is shown as a plurality of individual electrical wires 42 of the type typically encountered in electrical applications. It is however understood that while a wire bundle is shown, the present invention may also be employed with a single electrical cable or any other similar member on which identification is needed.

Cable tie assembly 1 of the present invention is employed as follows. Identification tag 12 is snapped onto cable tie head 18. Fingers 30 deflect to accommodate and engage shoulder 35. In this position tag 12 is independently supported on cable tie 10 with opening 28 aligned with channel 20. Cable tie 10 is then wrapped around bundle 40. Tail 16 is inserted through opening 28 of tag 12 into insertion end 20a of channel 20 and out through egressing end 20b. Cable tie 10 is then cinched in a conventional manner to secure it to bundle 40. At this stage, tag 12 is secured to bundle 40 not only by the securement of fingers 30 to cable tie head 18, but also by the threaded engagement of tail 16 through opening 28.

Either or both of surfaces 24 and 26 may be marked with appropriate indicia either placed directly thereon or with the application of adhesive backed labels. Of course, such marking could occur prior to attachment of tag 12 to cable tie 10.

The preferred embodiment of the present invention shown in FIGS. 1 through 3 provides for attachment of tag 12 to cable tie 10 by securing tag 12 directly to the cable tie head 18. It is also contemplated that the tag 12 may be attached to cable tie head 18 by use of securement means which provide engagement between the tag 12 and the strap 14 of cable tie 10.

Figure 4:
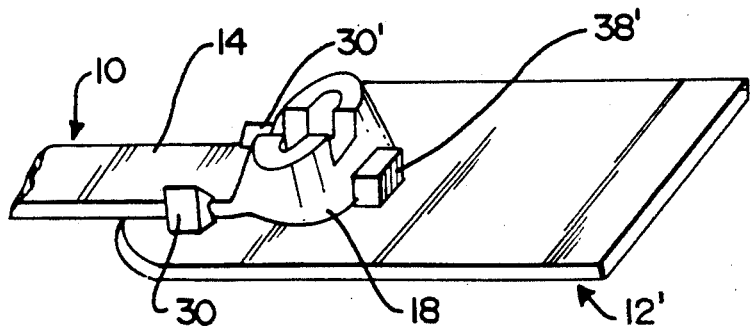
FIG. 4 shows a further embodiment of the cable tie assembly of the present invention.

As shown in FIG. 4, tag 12' may include a pair of opposed fingers 30', similar to fingers 30 described hereinabove, which engage in snap fashion strap 14 of cable tie 10 adjacent head 18. The opening (not shown) of tag 12' would be disposed so as to align with channel 20 of cable tie head 18 when the head 18 is properly positioned against tag 12'. A protruding stop element 38' would assist in the proper positioning of cable tie head 18 with respect to tag 12'. Thus as with the embodiment shown in FIGS. 1-3, tag 12' is positioned against head 18 with the opening in alignment with channel 20 of head 18, so that tail 16 (FIG. 3) may be inserted through the tag opening as well as the head channel.

Various changes to the foregoing described and shown structures would now be evident to those skilled in the art. Accordingly, the particularly disclosed scope of the invention is set forth in the following claims.

I claim:

1. A cable tie assembly comprising:
a cable tie including an elongate strap having a tail at one end, a head attached to the other end of said strap, said head having a channel therethrough for receipt of said tail; and
an identification tag capable of supporting identifying indicia, said tag having an opening therethrough; and means for removable securing said tag against said head and for aligning said tag opening with said head channel for passage of said tail through said tag opening;
said securing means including plural deflectable fingers extending from one planar surface of said identification tag, said fingers being disposed adjacent said tag opening for engagement with said cable tie and wherein said deflectable fingers engage said strap adjacent said head.

2. A cable tie assembly of claim 1, wherein said identification tag includes an elongate body having first and second opposed planar surfaces, said opening being adjacent one end of said tag.

3. A cable tie assembly of claim 2, wherein at least one of said opposed planar surfaces is capable of supporting said identifying indicia.

4. A cable tie assembly comprising:
a cable tie including an elongate strap having a tail at one end, a head attached to the other end of said strap, said head having a channel therethrough for receipt of said tail, said cable tie head including flat shoulder portions thereon; and
an identification tag capable of supporting identifying indicia, said tag having an opening therethrough; said tag including integrally formed deflectable fingers snap-engageable with said flat shoulder portions of said head for removably securing said tag to said head.

5. An identification tag for use with a cable tie having a head including a channel therethrough and a strap including a tail for passage through said head channel, said tag comprising:
an elongate tag body having first and second opposed planar surfaces, at least one of said surfaces being capable of supporting identifying indicia thereon, said tag body having an opening therethrough; and
plural deflectable fingers formed integrally with said tag body adjacent said opening for engagement with said strap adjacent said cable tie head.

* * * * *